Jan. 2, 1940. L. M. COTCHETT 2,185,245
CORD STRETCHING AND WINDING MACHINE
Filed April 14, 1938 2 Sheets-Sheet 1

INVENTOR
LOUIS M. COTCHETT
BY
ATTORNEYS

Jan. 2, 1940.  L. M. COTCHETT  2,185,245
CORD STRETCHING AND WINDING MACHINE
Filed April 14, 1938  2 Sheets-Sheet 2
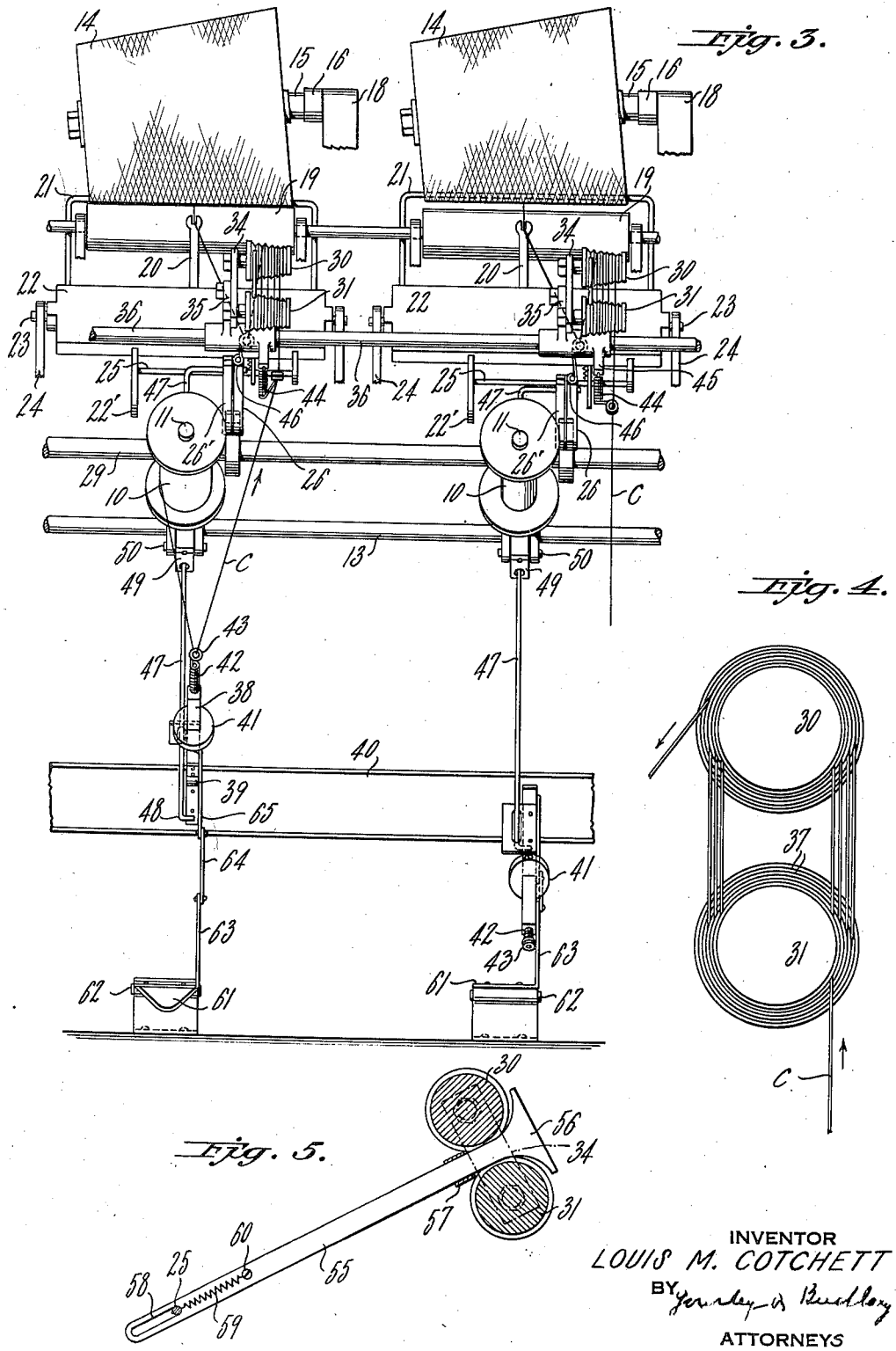
INVENTOR
LOUIS M. COTCHETT
BY
ATTORNEYS Patented Jan. 2, 1940

2,185,245

UNITED STATES PATENT OFFICE 2,185,245

CORD STRETCHING AND WINDING MACHINE

Louis M. Cotchett, Hingham, Mass., assignor, by mesne assignments, to United States Rubber Company, New York, N. Y., a corporation of New Jersey Application April 14, 1938, Serial No. 201,903

15 Claims. (Cl. 28—57)

This invention relates to a cord winding machine having associated therewith stretching mechanism for imparting a permanent stretch or elongation to the cord, and more particularly to stop mechanism cooperating therewith.

It is found that certain improved properties are imparted to a tire cord by permanently stretching, attenuating or elongating the cord, and in the Charles J. Killette application, Serial No. 141,952 filed May 11, 1937, for Apparatus for and method of stretching cords, there is shown, described and claimed an extremely simple and practical apparatus for imparting a permanent stretch to a cord. Such apparatus consists primarily of a pair of spaced free running rolls having grooves formed thereabout in stepped relation to each other and about which the cord is passed in a plurality of runs so that the tension upon the cord is increased as it passes from the smaller to the larger diameter grooves. The arrangement is such that the mere act of drawing the cord about these rolls from one stepped groove to another serves to impart the desired stretch or elongation to the cord.

Winding machines for winding cord from smaller to larger packages have been extensively used heretofore and the present invention relates to a combined winding and cord stretching machine, and more particularly to mechanism for quickly stopping the cord stretching and winding operation when the cord breaks or becomes exhausted.

Cord winding machines as constructed heretofore have been commonly provided with a supporting spindle adapted to rotatably support a let off spool so that the cord may be unwound from this spool and wound on to a much larger shipping package having the form of a cone or tube, and which cone or tube may rest upon a driving drum to be rotated thereby. A cord traversing guide serves to wind the cord evenly upon the takeup package. These winding machines are commonly provided with stop mechanism controlled by the tension of the cord so that if the cord breaks or becomes exhausted the winding operation is stopped. In these prior winding machines, it is not very difficult, when the winding has been stopped by the stop mechanism, to find the trailing end of the cord as it lays upon the take-up package and to tie it to the leading end of the next cord.

If, however, a cord stretching device such as herein contemplated is associated with a cord winding machine so that the cord is led from the let-off package to the stretching rolls and is then led to the takeup package, a much more serious condition arises when the cord breaks or becomes exhausted. This is due to the fact that the cord to be permanently stretched is passed about the grooves of the spaced stretching rolls in a number of successive runs, and if the cord breaks or becomes unduly slack it may become disengaged from the grooves of the stretching rolls, with the result that a tedious hand operation will then be required to rewind the cord about these successive grooves of the rolls.

Therefore a primary object of the present invention is to prevent the cord from escaping from the grooves of the stretching rolls or of becoming tangled when exhaustion or breakage of the cord occurs.

One important feature of the present invention resides in a cord exhaust detector which is adapted to operate when the winding machine is running at full speed and exhaustion is detected to stop the various winding operations before the trailing end of the cord reaches the stretching rolls. This cord exhaust detector controls brake mechanism for quickly arresting the rotation of the let-off spool and also controls mechanism for stopping the rotation of the takeup package.

Another feature of the invention resides in brake mechanism associated with the free running stretching rolls and which is adapted to quickly stop the coasting rotation of these rolls when the winding operation is being stopped.

Another feature of the present invention resides in mechanism for maintaining a substantially constant tension upon the cord as it passes from the let off spool to the stretching rolls.

Still another feature of the present invention resides in pedal control means which may be operated by the foot to elevate the cord tensioning arm to thereby facilitate threading up of the machine.

The above and other features of the invention and novel combination of parts will be hereinafter described in connection with the accompanying drawings which illustrate one good practical form thereof.

In the drawings:

Fig. 3 is a side elevation of the machine of Figs. 1 and 2, the mechanism of the left hand unit is shown in the cord winding position of Fig. 1, while the mechanism of the right hand unit is shown in the stop position of Fig. 2.

Figures 1, 2, 6:
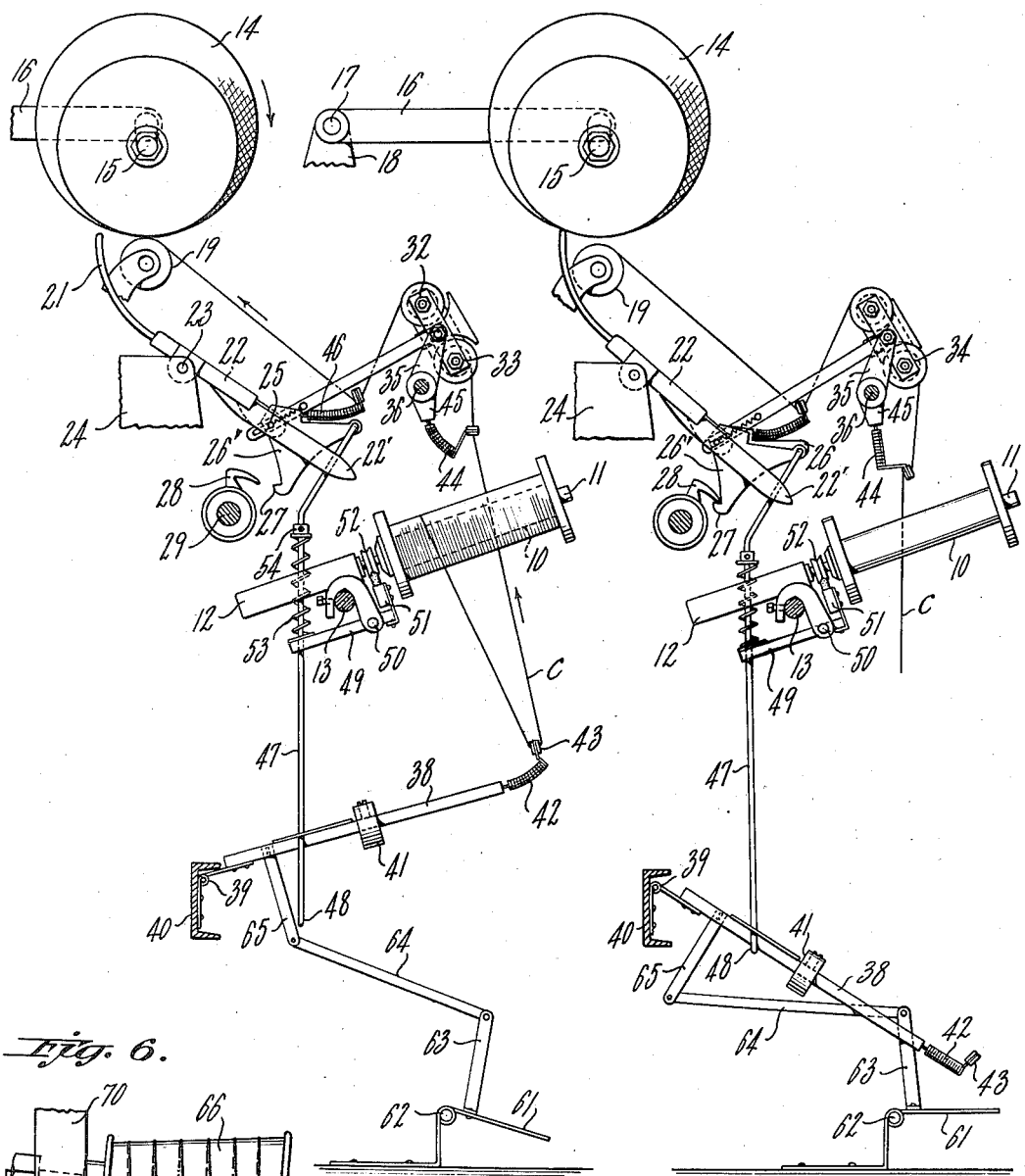
Fig. 1 is an end view of portions of a cord winding machine equipped with the mechanism of the present invention, the parts being shown in the running position.
Fig. 2 is a similar view showing the position of the parts when the winding operation is stopped as a result of cord exhaustion being detected.

Fig. 4 on a larger scale is an end view of the cord stretching rolls;

Fig. 5 is a vertical sectional view through the cord stretching rolls showing brake mechanism associated therewith; and Fig. 6 is a modification showing in side elevation a pair of grooveless stretching rolls.

The mechanism of the present invention may be employed to impart a permanent elongation to cords formed of various textile materials, but the invention was developed more particularly for use in connection with winding machines to impart a permanent elongation to cotton tire cords during the operation of winding the cord from a let-off spool to the take-up shipping package.

The stretching of the cord reduces its guage and increases its tensile strength relative to its weight. The stretched cord has a higher strength per unit of weight and this permits the construction of a lighter tire fabric.

The cord stretching mechanism of the present invention may be employed in connection with various types of winding machines but is shown as applied to a well known type of cord winding machine, certain elements of which are shown to make clear the cooperation of the mechanism of the present invention therewith.

In the embodiment of the invention illustrated the cord C to be stretched and wound into a large shipping package is supplied by a spool or let-off package 10 which is rotatably mounted upon an inclined spindle 11 that is journaled in the spindle supporting casing 12 mounted upon the supporting rod 13. The cord C after passing through various devices to be described is finally wound upon the cord takeup package or cone 14 which is rotatably supported by a spindle 15. This spindle may be supported for movement in an approximately vertical path by the swinging arm 16 one end of which is pivotally secured at 17 to a fixed support 18. The arrangement is such that the package or cone 14 irrespective of its size may rest by gravity upon the power driven drum 19 to be driven thereby. The cord C is wound evenly upon the package by the traversing mechanism 20.

When it is desired to stop the rotation of the takeup package 14, the package is lifted off of the driving drum 19 by means of a brake-bar 21 which engaged the surface of the package to frictionally arrest its rotation in addition to lifting it off of the driving drum. This brake-bar 21 is secured to and extends upwardly from a stop motion apron 22 which is pivotally mounted at 23 upon a fixed supporting bracket 24. The arrangement is such that this apron may be manually operated by means of the handle 22' to raise or lower the package 14, or it may be automatically depressed by mechanism to be described to stop the winding operation of the package 14.

In order automatically to operate the stop motion apron 22 there is pivotally secured thereto at 25 the drop wire castings 26 and 26' each of which is provided with a hook 27 adapted to be engaged by a rocker 28 secured to an oscillating rock shaft 29. The arrangement is such that the first drop wire casting 26 is held by the tension of the cord C out of the path of the rocker 28 during the normal operation of the machine, but when this cord breaks or becomes too slack, it permits the casting 26 to swing downwardly about its pivot 25 so that its hook 27 will lie in the path of the rocker 28. This will cause the rocker to engage the hook and depress the stop motion apron 22. The second drop wire casting 26' operates independently of the first as will be hereinafter described.

The mechanism so far described, except for the dual castings 26, 26', is standard equipment of a commercial cord winding machine but has been provided with the mechanism of the present invention to produce the combined cord stretching and winding machine which will now be described.

In accordance with the present invention the cord stretching mechanism has been interposed between the letoff package 10 and takeup package 14 so that the pull exerted upon the cord C by the takeup package serves to unwind the cord from the supply package 10 and also to draw the cord through the cord stretching mechanism to permanently stretch or elongate the same. This stretching mechanism may be variously constructed but preferably has the construction best shown in Fig. 4 and comprises the pair of tapered free running rolls 30 and 31. These rolls or pulleys are provided with annular cord receiving grooves of gradually increasing diameter, the arrangement being such that these grooves are formed in slightly stepped relation to each other. The rolls 30 and 31 are supported in spaced relation to each other by the shafts 32 and 33 upon which the rolls are mounted by anti-friction bearings and the shafts 32 and 33 are secured to a supporting bracket 34. The bracket 34 is rigidly secured by a clamping bolt to the outer end of the supporting arm or bracket 35 which is secured to the longitudinally extending bar 36 of the supporting frame.

It will be noted that the grooved rolls 30 and 31 are both tapered in the same direction as will be apparent from Fig. 3 so that when the cord C is wound about these rolls in successive runs as shown, the length of these runs is gradually increased as the cord passes from a smaller to a slightly larger groove. This serves to stretch the cord without greatly increasing the amount of pull which need be exerted upon the cord to operate the free running rolls. Therefore the pull which the takeup package exerts upon the cord serves to operate the stretching mechanism. The grooves upon these rolls may increase about $\frac{1}{32}$ of an inch in diameter progressively and the cord will slip more in the first few and last few grooves than it will in the central grooves. Most of the stretch of the cord takes place in the cross-over adjacent the central grooves. It is not essential however that the rolls 30, 31 be provided with the grooves 37 since other means may be provided for spacing the runs of the cords passing about these rolls.

Some little manual labor is required in threading up the machine to wind the cord C about the grooved rolls 30 and 31 in the successive run, and if this cord is permitted to escape from these grooved rolls every time a cord breaks or the source of supply upon the spool 10 becomes exhausted, the operation of the winding machine would be retarded and an excessive amount of manual labor would be required to manually place the cord around the stretching rolls. The present invention is therefore concerned largely with the problem of preventing the cord from escaping from the grooves of the stretching rolls or becoming tangled when the cord breaks or becomes exhausted.

When the cord becomes exhausted on the supply package 10 it is important that all winding operations be stopped before the trailing end of this cord C reaches the stretching rolls or permits the runs wound about these rolls to escape from the grooves thereof. Therefore the portion of the cord C extending from the spool 10 to the stretching rolls is provided with cord takeup and tensioning mechanism, which in the construction shown consists of the tension control arm 38 which may be pivotally supported at 39 from a longitudinally extending rail 40 of the machine frame. The arm 38 is shown as provided with a weight 41 adjustable lengthwise thereof to vary the tension which it exerts upon the cord C, and at the outer end of this arm is provided a longitudinally projecting spring or compensator 42 which is provided at its outer end with the cord guide eye 43. In the construction shown the cord C extends from the supply spool 10 downwardly through the guide eye 43 and then upwardly through the cord stretching or attenuating mechanism, and the weight of the arm 38 serves to maintain the desired tension upon this portion of the cord. The portion of the cord extending upwardly from the eye 43 to the stretching mechanism preferably passes through the guide eye of a second spring or compensator 44 one end of which is secured to a fixed bracket 45. The arrangement is such that this compensator 44 is held under lateral displacing tension when the cord C is taut but when the cord breaks or becomes too slack this compensator will return to its normal position with a snapping action and in doing so it serves to lessen the tendency of the cord C to escape from the grooves of the stretching rolls.

In the construction shown the cord C is wound in a number of runs about the stretching rolls 30, 31 and upon leaving these rolls passes through the guide eye of a third compensator 46 which is secured to the drop wire casting 26, the arrangement being such that the tension of this portion of the cord acts through the compensator 46 to hold the casting 26 out of the path of the rocker 28 during the normal operation of the machine, but when this cord breaks or becomes too slack it permits the drop wire casting to swing downwardly into the path of the rocker as above described and cause stoppage of the rotation of the takeup package 14. The compensators 42, 44 and 46 serve to cushion minor cord shocks in addition to performing their functions above described.

It is desirable to stop the cord winding operation not only when the portion of the cord engaged by the compensator 46 becomes too slack, but also when the portion of the cord C acted upon by the tension control arm 38 becomes too slack or exhausted. The present invention therefore contemplates means whereby the second drop wire casting 26' is placed under the control of the arm 38. To this end in the construction shown the drop wire casting 26' has pivotally secured to its outer extremity, the upper end of the drop wire 47. The lower portion of this wire extends downwardly through a hole in the arm 38 and the lower end of this wire is provided with a head or laterally extending portion 48 adapted to be engaged by the tension control arm 38 when the latter swings downwardly to an abnormal low position as shown in Fig. 2, wherein it will be noted that the downward pull of the arm 38 upon the wire 47 has served to swing the drop wire casting 26' in the path of the rocker 28 to thereby depress the stop motion apron and stop the winding operation as shown in Fig. 2. This may take place while the tension of the cord C holds the casting 26 elevated.

The present invention contemplates that this combined stretching and winding machine will be operated at high speed, and therefore the free running parts of this machine may tend to coast or rotate for some time as a result of this high speed after the power has been cut off. Mechanism is therefore provided to quickly arrest the rotation of the let-off spool 10 when the stop motion apron 22 has been depressed. This mechanism as shown comprises a brake lever 49 which is pivotally supported intermediate its ends at 50. To one end of this lever is secured the brake member 51 adapted to engage the whirl 52 of the spindle 11 to arrest its rotation. The opposite end of this lever 49 is provided with a hole through which the drop wire 47 loosely passes, and about this drop-wire is provided the coiled spring 53, one end of which rests upon the upper face of the lever 49 and the other end abuts against a collar 54 adjustably secured upon the rod 47. The arrangement is such that the spring 53 serves to yieldingly apply the brake 51 and stop the rotation of the spindle 11 where the rod 47 is depressed. This spring 53 may serve also to apply the brake 51 under less force during the normal winding operation to thereby prevent the spool 10 from rotating too freely as the cord is unwound therefrom, and cause the cord to be supplied to the tension rolls 30, 31 under substantial tension.

The high speed at which the present machine is operated causes the stretching rolls 30 and 31 to rotate rapidly and since they are provided with anti-friction bearings they may continue to rotate due to momentum after the winding operation has been stopped. It therefore may be desirable to provide brake means for quickly arresting the momentum rotation of these stretching rolls. They are therefore shown as provided with the brake rod 55 which is provided at its outer end with a brake head 56 adapted to press upon the peripheries of the rolls 30 and 31 to arrest their rotation. The rod 55 is slidably supported by the guiding bracket 57 (see Fig. 5) which may be mounted upon the bracket 34. The opposite end of the brake rod 55 is provided with the elongated slot 58 adapted to receive the pivot pin 25 above mentioned. A coiled spring 59 having one end secured to the pivot pin 25 and its other end secured to the brake rod 55 at 60 serves to apply the brake 56 with a yielding force when the stop motion apron 22 is depressed.

In order to facilitate the threading of the cord through the guide eye 43 at the outer end of the drop arm 38, treadle operated means is shown for elevating this arm. This treadle mechanism consists of the foot treadle 61 pivoted at 62 to a supporting bracket, and extending upwardly from the treadle 61 is an arm 63 at the outer end of which is connected by a link 64 to the downwardly extending arm 65 rigidly secured to the tension control arm 38. The arrangement is such that when the foot treadle 61 is depressed it will elevate the arm 38 from its machine stopping position of Fig. 2 to the machine running position of Fig. 1 to thereby facilitate threading of the cord through the eye 43.

It will be seen from the foregoing that the winding operation will be stopped and the brakes 51 and 56 will be applied to quickly arrest the rotation of the spool 10 and rolls 30 and 31 when the stop motion apron 22 is depressed, and that this apron will be automatically depressed when the portion of the cord engaged either by the compensator 42 or the compensator 46 becomes too slack. Furthermore, if the machine is operating at high speed and a trailing end of the cord leaves the supply spool 10, the winding operation will be automatically stopped and the movement of all parts will be arrested before the trailing end of the cord reaches the stretching rolls or escapes from the compensator 44. After the winding operation has been stopped it may be started again by manually raising the apron 22.

It is found that it is not essential that the cord stretching rolls 30 and 31 be provided with the grooves 37 to keep the adjacent runs of the cord properly spaced, since this same object may be secured by employing the grooveless stretching rolls shown in Fig. 6. In this modified construction it will be noted that the tapered rolls 66 and 67 have smooth outer surfaces and that the supporting shafts 68 and 69 are secured to the bracket 70 so that these rolls rotate about slightly converging axes. The arrangement is such that the cord C is wound about these rolls in successive runs as shown to travel gradually lengthwise of the rolls from their smaller ends towards their larger ends, the rolls being so mounted that the tension upon the successive runs of the cord increases as these runs advance toward the larger ends of these rolls. It is found that this construction serves to keep the adjacent runs properly spaced and that this type of stretching rolls is considerably easier to thread up by hand than the grooved construction of Fig. 4.

Through the construction of the present invention a cord may be permanently stretched or elongated while it is undergoing the usual operation of being wound from a let off spool to the large shipping package, and as a result the stretching is secured without requiring any separate operation or appreciable added operating cost.

Having thus described my invention, what I claim and desire to protect by Letters Patent is:

1. In a cord winding machine in combination, a cord take-up package, driving means for winding the cord thereupon, a cord let-off package, a cord stretcher, including free running rolls about which the cord passes, said rolls being interposed between the let-off and take-up packages and adapted to be operated to stretch the cord solely by the advancing pull exerted upon the cord as it passes from the let-off to the take-up package, a cord exhaust detector, and means controlled thereby and operable upon detecting an exhaust condition to stop the winding operation.

2. In a cord winding machine in combination, a cord take-up package, driving means for winding the cord thereupon, a cord let-off package, a cord stretcher including free running rolls about which the cord passes in a plurality of runs, said rolls being interposed between the let-off and take-up packages and adapted to be operated to stretch the cord solely by the advancing pull exerted upon the cord as it passes from the let-off to the take-up package, a cord exhaust detector, and means controlled thereby and operable under full speed running conditions to stop the winding operation when exhaustion upon the let-off package is detected before the trailing cord end reaches the cord stretcher.

3. In a cord winding machine in combination, a cord take-up package, driving means for winding the cord thereupon, a cord let-off package, a cord stretcher including rotating rolls having cord stretching grooves and operated by the pull of the take-up winding means upon the cord, a cord exhaust detector for detecting when the cord supplied by the let-off package approaches exhaustion, and means controlled thereby and operable under full speed running conditions to stop the winding operation before the trailing cord end reaches the cord stretcher.

4. In a machine of the class described in combination, a source of cord supply, power operated cord take-up means, a cord stretcher located between the take-up means and cord supply including rotating stretcher rolls operated to stretch the cord solely by the advancing pull exerted upon the cord, a cord exhaust detector cooperating with the source of cord supply, and means controlled thereby and operable under full speed running conditions to stop the cord take-up means before the trailing cord end reaches the cord stretcher.

5. In a machine of the class described in combination, a source of cord supply, power operated cord take-up means, a cord stretcher including free running rolls having cord stretching grooves and operated by the pull of the take-up means upon the cord, a cord exhaust detector cooperating with the source of cord supply, brake means for arresting the rotation of said rolls, and means controlled by said detector and operable to apply said brake means and to stop the cord take-up means.

6. In a machine of the class described in combination, cord left-off mechanism, cord take-up mechanism, driving means for the take-up mechanism, a pair of free running stretching rolls interposed between the mechanisms and about which the cord passes in a plurality of runs, said rolls being adapted to be operated to stretch the cord by the advancing pull exerted upon the cord, a cord exhaust detector, and means controlled thereby and operable under full running speed to stop the take-up mechanism when exhaustion is detected before the trailing cord end reaches the cord stretcher rolls.

7. In a cord winding machine in combination, a cord take-up package, driving means for winding the cord thereupon, a cord let-off spool, a cord stretcher including a pair of free running rolls having the cord passed thereabout in a plurality of runs and adapted to be operated solely by the advancing pull exerted on the cord to stretch the cord as it passes from said spool to the take-up package, a combined cord exhaust detector and cord tensioning means cooperating with the cord supplied from said spool, and means controlled thereby and operable under full speed running conditions to stop the winding operation before the trailing exhaust end reaches the cord stretcher.

8. In a cord winding machine in combination, a cord take-up package, driving means for winding the cord thereupon, a cord left-off spool, a cord stretcher including a pair of free running rolls having cord stretching grooves and arranged to stretch the cord as it passes from said spool to the take-up package, a brake for stopping the rotation of said spool, a cord exhaust detector cooperating with said spool, and means controlled thereby and operable to stop the winding operation and apply said brake when exhaustion is detected.

9. In a cord winding machine in combination, a cord take-up package, driving means for winding the cord thereupon, a cord let-off spool, cord stretching means for stretching the cord as it passes from said spool to said package including a pair of free running rolls about which the cord passes and adapted to be operated to stretch the cord by the advancing pull exerted on the cord, brake means for said let-off spool, and means controlled by the tension of said cord and operable when the cord becomes slack to stop the rotation of the take-up package and to apply said brake means.

10. In a machine of the class described in combination, cord let-off mechanism, cord take-up mechanism, driving means for the take-up mechanism, a pair of free running rolls interposed between the mechanisms and provided with annular cord stretching grooves about which the cord passes in a plurality of convolutions, brake means for said rolls, a cord exhaust detector, and means controlled thereby and operable to stop the take-up mechanism and apply said brake means when cord exhaustion is detected.

11. In a cord winding machine in combination, a cord take-up package, driving means therefor, a cord let-off spool, a cord stretcher including a pair of free running rolls having cord stretching grooves and operated by the pull of the take-up means upon the cord, brake means cooperating with said rolls, brake means cooperating with said spool, a cord exhaust detector, and means controlled thereby and operable to apply both of said brake means and to stop the take-up means when cord exhaustion occurs.

12. In a cord winding machine in combination, a cord take-up package, driving means for winding the cord thereupon, a cord let-off package, a cord stretcher including a pair of free running rolls arranged to stretch the cord as it passes from said let-up package to the take-up package, a brake for stopping the rotation of said rolls, and means under the control of the cord and operable to stop the winding operation and simultaneously apply said brake.

13. In a cord winding machine in combination, a cord take-up package, driving means for winding the cord thereupon, a cord let-off spool, a cord stretcher including a pair of free running rolls having cord stretching grooves and arranged to stretch the cord as it passes from said spool to the take-up package, a swinging control arm adapted to be supported by the cord extending between said spool and cord stretcher, means controlled by said arm for stopping the winding operation when the cord fails to support said arm, and a treadle for raising said arm.

14. In a cord winding machine in combination, a cord take-up package, driving means for winding the cord thereupon, a cord let-off spool, a cord stretcher including a pair of free running rolls having the cord wound thereabouts in a number of runs as it passes from said spool to the take-up package, a cord tensioning element engaging the cord extending between said spool and cord stretcher, a winding arresting casting under the control of said element, and a second winding arresting casting under the control of the portion of the cord extending between the cord stretcher and take-up package.

15. In a cord winding machine in combination, a cord let-off spool, cord take-up mechanism, driving means for said mechanism, a pair of free running stretching rolls interposed between said spool and mechanism and about which rolls the cord passes back and forth in a number of runs of successively increasing length, said rolls being adapted to be operated to stretch the cord by the advancing pull exerted upon the cord, a cord exhaust detector, and brake means controlled thereby and operable to stop the rotation of the let-off spool.

LOUIS M. COTCHETT.